(12) United States Patent
Wade et al.

(10) Patent No.: US 8,379,337 B2
(45) Date of Patent: Feb. 19, 2013

(54) LENS DRIVE DEVICE

(75) Inventors: Tatsuki Wade, Nagano (JP); Takeshi Sue, Nagano (JP); Akihito Wada, Nagano (JP)

(73) Assignee: Nidec Sankyo Corporation (JP)

( * ) Notice: Subject to any disclaimer, the term of this patent is extended or adjusted under 35 U.S.C. 154(b) by 122 days.

(21) Appl. No.: 13/012,021

(22) Filed: Jan. 24, 2011

(65) Prior Publication Data

US 2012/0120512 A1    May 17, 2012

(30) Foreign Application Priority Data

Jan. 26, 2010  (JP) .................................. 2010-14668

(51) Int. Cl.
*G02B 7/02* (2006.01)
*G03B 17/00* (2006.01)

(52) U.S. Cl. ........................... 359/824; 359/557; 396/55

(58) Field of Classification Search .................... 396/55; 359/824, 694, 557
See application file for complete search history.

(56) References Cited

U.S. PATENT DOCUMENTS

| | | | |
|---|---|---|---|
| 2006/0153556 A1* | 7/2006 | Lee et al. ........................ | 396/133 |
| 2010/0033852 A1* | 2/2010 | Ke ................................ | 359/824 |
| 2010/0098394 A1* | 4/2010 | Ishihara et al. ................. | 396/55 |
| 2010/0328791 A1* | 12/2010 | Jung et al. ...................... | 359/824 |

FOREIGN PATENT DOCUMENTS

| JP | 2006-251111 A | | 9/2006 |
|---|---|---|---|
| KR | 20090083123 A | * | 8/2009 |

* cited by examiner

*Primary Examiner* — Thomas K Pham
*Assistant Examiner* — William M Johnson
(74) *Attorney, Agent, or Firm* — Cantor Colburn LLP (57) ABSTRACT

A lens drive device may include a front side spring member which is connected between a movable body having a lens and a support body. The front side spring member includes a support body side connecting part, a movable body side connecting part and a arm part connected between the support body side connecting part and the movable body side connecting part. The support body includes a yoke having a yoke front plate part and the yoke front plate part is formed with a yoke opening part which is overlapped with at least a part of the front side spring member. Damper material having viscoelasticity is provided, for example, on a portion extending over the movable body side connecting part and the arm part and overlapped with the yoke opening part in the lens optical axis direction. Therefore, the damper material can be applied to the front side spring member through the yoke opening part in the final stage of assembling steps.

14 Claims, 9 Drawing Sheets

LENS DRIVE DEVICE

CROSS REFERENCE TO RELATED APPLICATION

The present invention claims priority under 35 U.S.C. §119 to Japanese Application No. 2010-14668 filed Jan. 26, 2010, the entire content of which is incorporated herein by reference.

FIELD OF THE INVENTION

At least an embodiment of the present invention may relate to a lens drive device in which a movable body provided with a lens is connected with a support body through a spring member.

BACKGROUND

A lens drive device which is mounted on a cell phone with a camera, a digital camera or the like includes a movable body provided with a lens, a support body disposed on an outer side of the movable body, and a magnetic drive mechanism which magnetically drives the movable body in a lens optical axis direction. Further, in the lens drive device, an end part of the movable body and the support body are connected with each other through a spring member, and the movable body is moved to a predetermined position in the optical axis direction by means of that an urging force of the spring member and a thrust force of the magnetic drive mechanism are balanced with each other. In the lens drive device having the structure as described above, since the movable body is supported by the spring member, when the movable body is driven or, when vibration is applied from the outside, the movable body may be vibrated.

In order to prevent this problem, in this type of the lens drive device, a technique has been proposed in which damper material made of resin having elasticity is provided at both of a portion of the spring member extending over its movable body side connecting part and its arm part and a portion extending over the arm part and its support body side connecting part to damp vibration of the movable body (see, Japanese Patent Laid-Open No. 2006-251111).

In the structure described in the above-mentioned Patent Literature, the damper material which is provided so as to extend over the arm part and the support body side connecting part is located at a portion overlapping with a front plate part of the support body facing a front side end part of the movable body in the optical axis direction, and the damper material which is provided so as to extend over the movable body side connecting part and the arm part is located at a portion overlapping with an opening part of the front plate part.

However, as described in the above-mentioned Patent Literature, in order to provide the damper material extending over the arm part and the support body side connecting part at a portion overlapping with the front plate part of the support body in the optical axis direction, the damper material is required to be provided on the spring member before the support body is disposed on the front side of the spring member in the optical axis direction in the middle of a manufacturing process of the lens drive device. Therefore, the following problems are occurred.

First, when gel-like damper material is applied or provided in the middle of the manufacturing process of the lens drive device, the damper material may be stuck to other portions in the later assembling process. Further, in a case that gel-like damper material is applied or provided in the middle of the manufacturing process of the lens drive device, when the lens drive device is washed after completion of assembling, the damper material may be melted to stick to other portions and thus washing cannot be performed after completion of assembling of the lens drive device. Further, in a case that gel-like damper material is applied or provided in the middle of the manufacturing process of the lens drive device, an amount of the damper material cannot be adjusted on the basis of the result of confirming the operation of the lens drive device after assembling of the lens drive device has been completed.

SUMMARY

In view of the problems described above, at least an embodiment of the present invention may advantageously provide a lens drive device in which damper material is capable of applying in the final stage of assembling steps of the lens drive device.

Further, at least an embodiment of the present invention may advantageously provide a lens drive device in which a front side end part of the movable body is capable of being sufficiently covered by a yoke that is used as a support body even when the lens drive device is structured so that damper material is capable of being applied or provided in the final stage of assembling steps.

According to at least an embodiment of the present invention, there may be provided a lens drive device including a support body, a movable body provided with a lens, a magnetic drive mechanism for magnetically driving the movable body in a lens optical axis direction with respect to the support body, and a front side spring member which is connected with a front side end part in the lens optical axis direction of the movable body and the support body. The front side spring member includes a support body side connecting part which is connected with the support body, a movable body side connecting part which is located on an inner peripheral side with respect to the support body side connecting part and connected with the movable body, and a arm part which is connected with the support body side connecting part and the movable body side connecting part. The support body includes a yoke which is provided with a yoke front plate part which faces the front side end part of the movable body from a front side in the lens optical axis direction and a yoke side plate part which faces a side face part of the movable body. The yoke front plate part is formed with a yoke opening part which is overlapped with at least a part of the front side spring member in the lens optical axis direction. Damper material having viscoelasticity is applied to or provided on one of a portion extending over the movable body side connecting part and the arm part, a portion extending over the arm part and the support body side connecting part, a portion extending over the movable body side connecting part and the support body side connecting part, a portion extending over the movable body and the arm part, a portion extending over the arm part and the support body, and a portion extending over the movable body and the support body and, in addition, the portion is overlapped with the yoke opening part in the lens optical axis direction.

In the lens drive device in accordance with an embodiment of the present invention, since the movable body is supported by the front side spring member, when the movable body is driven or, when vibration is applied from the outside, the movable body may be vibrated. However, according to the embodiment of the present invention, damper material having viscoelasticity is applied to or provided on one of a portion extending over the movable body side connecting part and the arm part, a portion extending over the arm part and the support body side connecting part, a portion extending over the movable body side connecting part and the support body side connecting part, a portion extending over the movable body and the arm part, a portion extending over the arm part and the support body, and a portion extending over the movable body and the support body and thus, the vibration of the movable body is damped in a short time period. Further, the damper material is provided on a portion overlapping in the optical axis direction with the yoke opening part which is provided in the yoke front plate part and thus, the damper material can be applied to or provided on the front side spring member disposed in the inside through the yoke opening part in the final stage of assembling steps. Therefore, the damper material is prevented from sticking to other portions after the damper material has been applied and, even when washing is performed after assembling of the lens drive device has been completed, no damper material is melted to stick to other portions. Further, since the damper material is applied to or provided on the front side spring member disposed in the inside through the yoke opening part in the final stage of assembling steps, after an operation of the lens drive device has been confirmed in the final stage of assembling, an amount of the damper material can be adjusted on the basis of the result of confirming its operation.

In accordance with an embodiment of the present invention, the damper material is applied or provided only to the portion extending over the movable body side connecting part and the arm part. When the damper material is applied to or provided on a portion extending over the movable body side connecting part and the arm part, the damper material is located on the inner peripheral side and thus the size of the yoke opening part can be made relatively small. Therefore, the front side end part of the movable body can be sufficiently covered by the yoke that is used as the support body and thus leakage of magnetic flux and entering of foreign matters through the yoke opening part are restrained.

In accordance with an embodiment of the present invention, the yoke opening part is provided with a circular opening portion with the lens optical axis as a center and a protruded opening portion which is protruded to an outer side in a radial direction from an outer circumferential edge of the circular opening part, and the damper material is applied to or provided on the portion overlapping with the protruded opening portion in the lens optical axis direction. According to this structure, even when the damper material is applied to or provided on a portion located on the outer peripheral side, the yoke opening part may be made relatively small and thus leakage of magnetic flux and entering of foreign matters through the yoke opening part can be restrained. In this case, it is preferable that the circular opening portion is formed so as to cover the movable body side connecting part and the arm part of the front side spring member when viewed in the lens optical axis direction.

In accordance with an embodiment of the present invention, the yoke front plate part is formed in a rectangular shape when viewed in the lens optical axis direction, and the protruded opening portion is protruded toward a corner portion of the yoke front plate part. According to this structure, since the protruded opening portion is directed to a corner portion of the yoke front plate part which is a portion having a margin in space and thus the size of the lens drive device in a direction perpendicular to the lens optical axis can be made relatively small. Specifically, it may be structured that the yoke front plate part is formed in a rectangular shape having four corner portions when viewed in the lens optical axis direction, the support body side connecting part of the front side spring member is located at positions overlapping with the four corner portions of the yoke front plate part, the arm part is extended in a substantially circular arc shape from a connected portion with the support body side connecting part to the movable body side connecting part, and a connected portion of the arm part with the movable body side connecting part and the connected portion of the arm part with the support body side connecting part are disposed with an equal angular interval in a circumferential direction with the lens optical axis as a center. In this case, when the connected portion of the movable body side connecting part with the arm part and the connected portion of the support body side connecting part with the arm part are located in the same protruded opening portion, the number of positions where the damper material can be applied is increased. In accordance with an embodiment of the present invention, the damper material is applied so as to extend over the movable body side connecting part and a portion of the arm part in the vicinity of the connected portion of the arm part with the support body side connecting part.

In accordance with an embodiment of the present invention, the support body is provided with a spacer which is disposed between the front side end part of the movable body and the yoke front plate part and connected with the support body side connecting part, and the spacer is provided with a spacer opening part whose opening area is larger than an opening area of the yoke opening part and which is overlapped with the yoke opening part in the lens optical axis direction.

According to this structure, the front side spring member can be fixed by using the spacer and thus, different from a case that the front side spring member is directly fixed to the yoke, a complicated work such that a protruded part for fixing the front side spring member is provided on the inner side of the yoke is not required. Moreover, the spacer is formed with the spacer opening part having larger opening area than the yoke opening part so as to overlap with the yoke opening part in the optical axis direction and thus the damper material can be applied to or provided on the front side spring member through the yoke opening part even when the spacer is disposed between the front side end part of the movable body and the yoke front plate part.

In accordance with an embodiment of the present invention, the damper material is applied to or provided on plural positions with an equal angular interval in a circumferential direction with the lens optical axis as a center. According to this structure, vibration of the movable body is efficiently damped without deviation in the circumferential direction.

In accordance with an embodiment of the present invention, the damper material is silicone-based viscoelastic composition. When this type of the damper material is utilized, the damper material can be applied by coating. Therefore, it is suitable to apply the damper material to the front side spring member disposed in the inside through the yoke opening part in the final stage of assembling steps. Further, silicone-based viscoelastic composition is superior in adhesiveness to a structural member.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings. A lens drive device which will be described below is capable of being mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like.

Figures 1A, 1B:
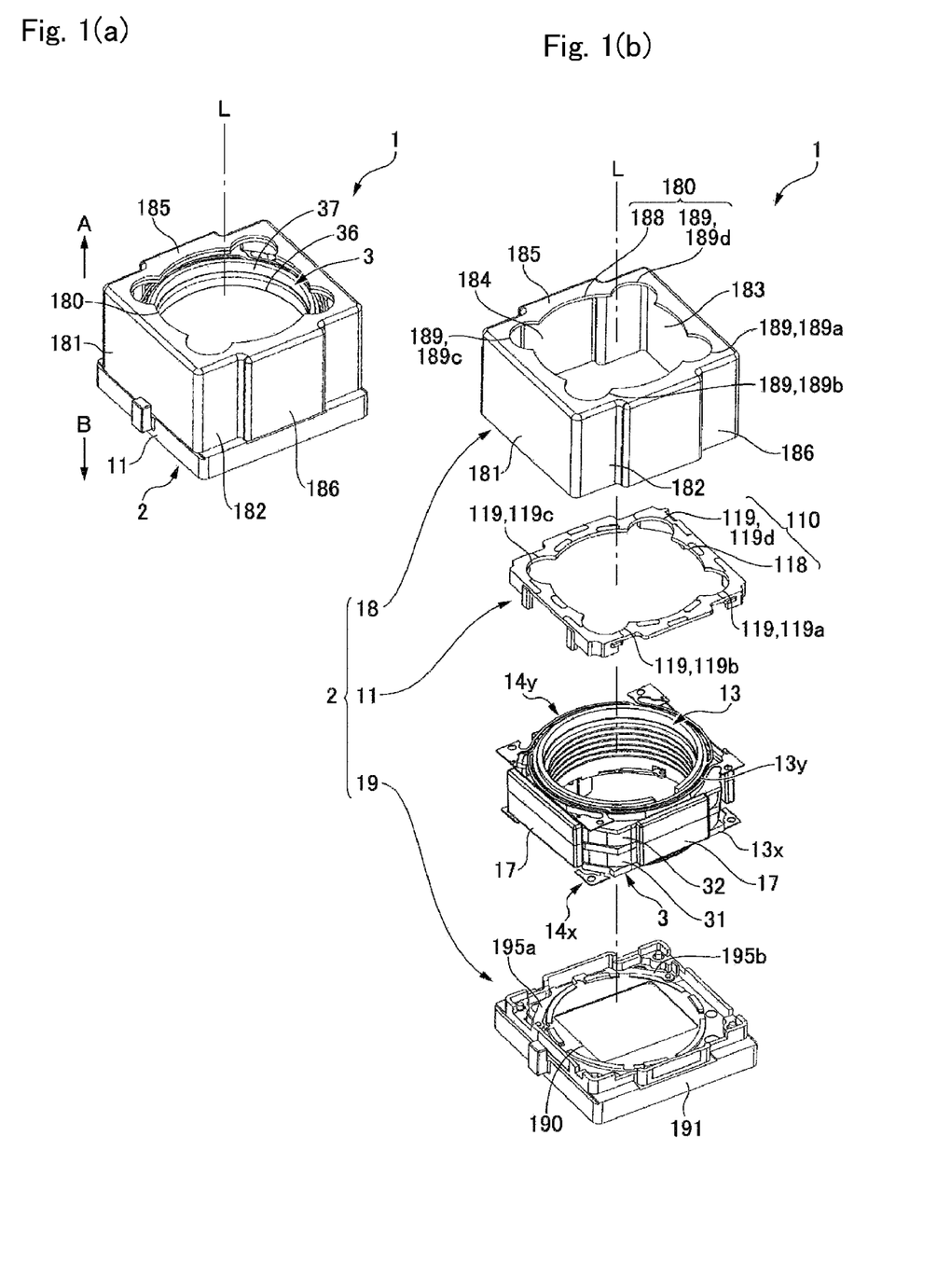
FIGS. 1(a) and 1(b) are explanatory views showing an entire structure of a lens drive device in accordance with an embodiment of the present invention.
Figure 2:
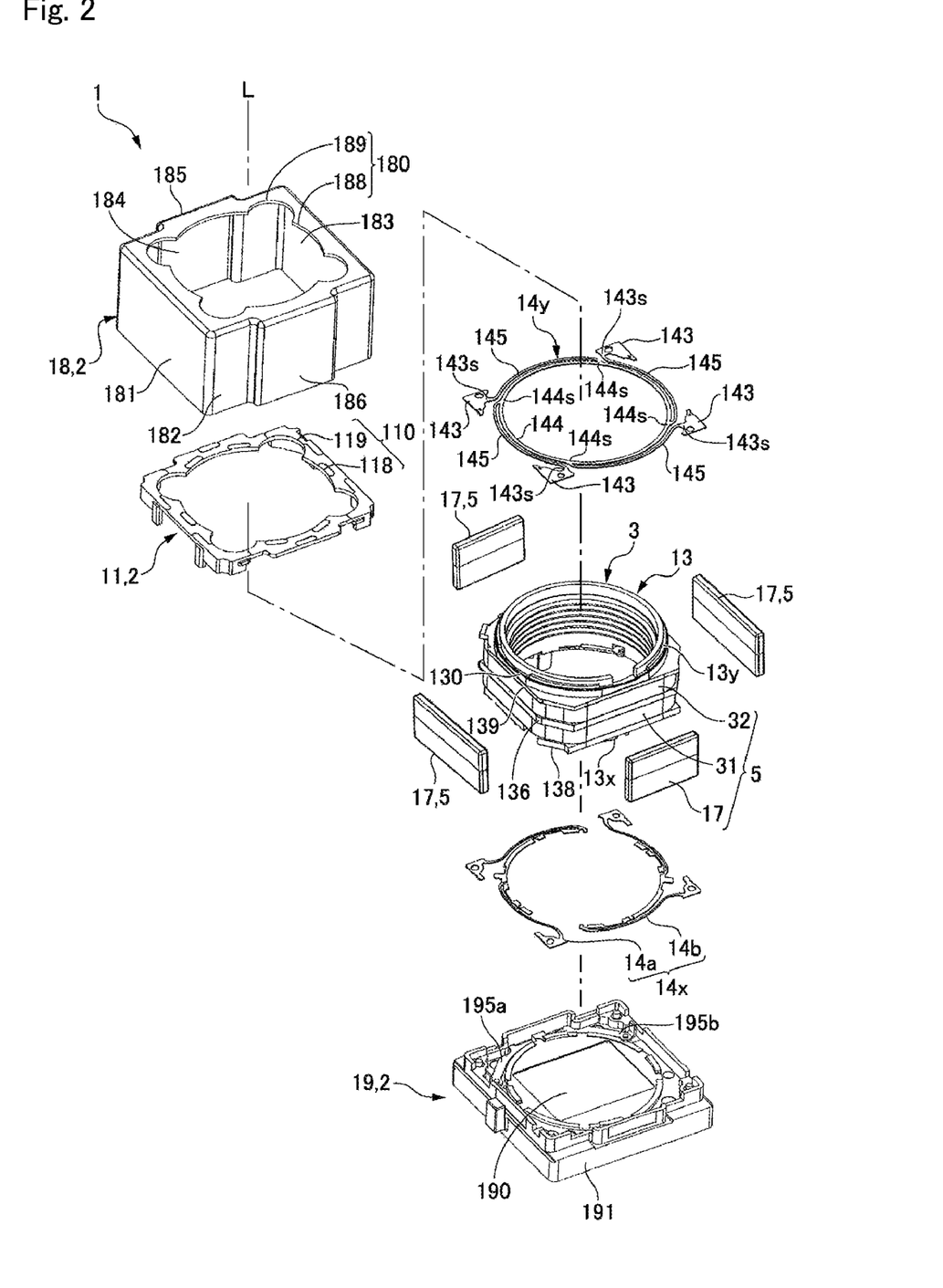
FIG. 2 is an exploded perspective view showing a lens drive device in accordance with an embodiment of the present invention which is disassembled further in detail and viewed from a front side in an optical axis direction.
Figure 3:
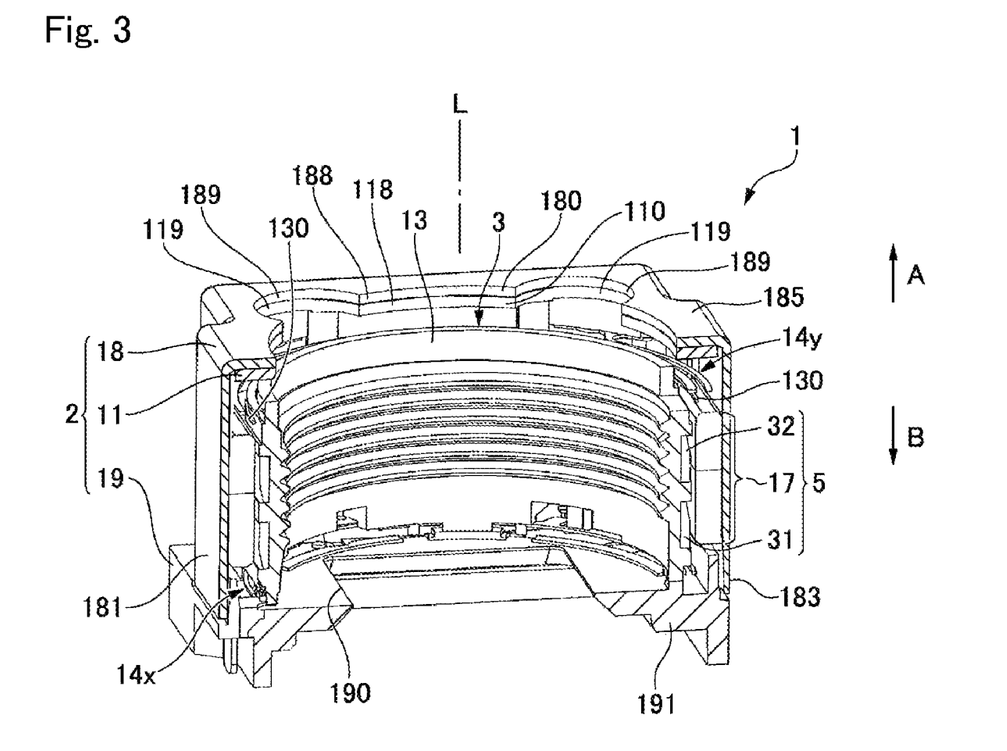
FIG. 3 is a longitudinal sectional view showing a lens drive device in accordance with an embodiment of the present invention which is cut at a position passing the centers of its sides facing each other.

FIGS. 1(a) and 1(b) are explanatory perspective views showing an entire structure of a lens drive device in accordance with an embodiment of the present invention. FIG. 1(a) is an outward appearance view showing the lens drive device in accordance with an embodiment of the present invention which is viewed from a front side in an optical axis direction (an object to be photographed side) and FIG. 1(b) is an exploded perspective view showing the lens drive device which is viewed from the front side in the optical axis direction. FIG. 2 is an exploded perspective view showing the lens drive device in accordance with an embodiment of the present invention which is disassembled further in detail and viewed from the front side in the optical axis direction. FIG. 3 is a longitudinal sectional view showing the lens drive device in accordance with an embodiment of the present invention which is cut at a position passing the centers of its sides facing each other.

In FIGS. 1(a) and 1(b) and FIG. 2, a lens drive device 1 in this embodiment is structured so that a lens 36 and a diaphragm are moved along a lens optical axis direction "L" in both of an "A"-direction (front side) toward an object to be photographed (object side) and a "B"-direction (rear side) toward an opposite side (image side) to the object to be photographed in a thin camera which is used in a cell phone with a camera or the like. The lens drive device 1 is formed in a substantially rectangular parallelepiped shape. The lens drive device 1 generally includes a movable body 3, which is provided with a cylindrical lens holder 37 having one or plural pieces of lenses 36 and a fixed diaphragm in its inside, a magnetic drive mechanism 5 for moving the movable body 3 along the optical axis direction "L" of the lens 36, and a support body 2 on which the magnetic drive mechanism 5, the movable body 3 and the like are mounted. The movable body 3 includes a sleeve 13 formed in a tube-like shape, and a lens holder 37 in a cylindrical shape is fixed on its inside by a screw mechanism. Therefore, an outward shape of the movable body 3 is determined by the sleeve 13 and formed in a roughly rectangular pole shape.

The fixed body 2 includes a holder 19 made of a rectangular resin plate for holding an imaging element (not shown) on a rear side and, on the front side in the optical axis "L" direction, includes a box-shaped yoke 18 and a spring support spacer 11 for supporting a spring. A spacer opening part 110 and a yoke opening part 180 are respectively formed at centers of the spacer 11 and a yoke front plate part 185 of the yoke 18 for taking light from an object to be photographed into the lens 36. The yoke 18 is structured of a ferromagnetic plate such as a steel plate. As described below, the yoke 18 structures an interlinkage magnetic field generating body together with magnets 17 for generating an interlinkage magnetic field in a first coil 31 and a second coil 32 which are held by the sleeve 13. The spacer 11 is made of nonmagnetic metal or resin.

The holder 19 is formed with an opening part 190 at a center portion of a rectangular main body portion 191 so that incident light through the lens 36 is capable of being received by the imaging element. Further, the holder 19 holds terminal members 195a and 195b for supplying power to the first coil 31 and the second coil 32.

The magnetic drive mechanism 5 includes the first coil 31 and the second coil 32, which are wound around an outer peripheral face of the sleeve 13, and the interlinkage magnetic field generating body for generating an interlinkage magnetic field in the first coil 31 and the second coil 32. The magnetic drive mechanism 5 is structured of the first coil 31, the second coil 32 and the interlinkage magnetic field generating body. The interlinkage magnetic field generating body includes four magnets 17 which face the first coil 31 and the second coil 32 on their outer peripheral sides. In this embodiment, the yoke 18 is also used as a structural element of the magnetic drive mechanism 5.

The yoke 18 is formed in a box-like shape which is provided with a yoke front plate part 185 for covering a front side of the second coil 32 located on a front side the optical axis "L" direction and a rectangular tube-shaped body part 186. The yoke front plate part 185 faces an end part of the movable body 3 on the front side in the optical axis "L" direction. The rectangular tube-shaped body part 186 is provided with side plate parts 181, 182, 183 and 184 which cover side faces of the first coil 31 and the second coil 32 and thus leakage flux from magnetic paths structured between the magnets 17 and the first coil 31 and the second coil 32 is reduced. According to this structure, a linearity between a moving amount of the movable body 3 and a current supplied to the first coil 31 and the second coil 32 is improved.

In this embodiment, four magnets 17 are respectively formed in a rectangular plate shape and fixed to inner faces of the side plate parts 181, 182, 183 and 184 except four corners of the yoke 18. Each of four magnets 17 is divided into two pieces in the optical axis "L" direction and each of the magnets 17 is magnetized so that its inner face and its outer face are magnetized to be different from each other. The four magnets 17 are, for example, magnetized so that inner faces of their upper half portions are magnetized to be an "N"-pole and their outer faces are magnetized to be an "S"-pole, and are magnetized so that inner faces of their lower half portions are magnetized to be an "S"-pole and their outer faces are magnetized to be an "N"-pole. Therefore, winding directions of coil wires of the first coil 31 and the second coil 32 are opposite to each other.

In this embodiment, the spacer 11 is a rectangle frame-shaped member provided with a spacer opening part 110. The spacer 11 is fixed to the yoke 18 in an overlapped state with an inner face of the yoke front plate part 185 of the yoke 18 by an adhesively bonding method or the like and the spacer 11 is intervened between the yoke front plate part 185 and the movable body 3. A rear side face of the spacer 11 is provided with protruded parts (not shown) protruded to the rear side from its corner portion. The protruded parts are provided with a function holding a front side spring member 14y which will be described below.

The lens drive device 1 in this embodiment includes a rear side spring member 14x for connecting the support body 2 with the movable body 3 between the holder 19 and the sleeve 13 and the front side spring member 14y for connecting the support body 2 with the movable body 3 between the spacer 11 and the sleeve 13. Each of the rear side spring member 14x and the front side spring member 14y is made of metal such as beryllium copper or SUS steel material and is formed by means of that a thin plate having a certain thickness is performed by press working or etching processing using photo lithography technique. The rear side spring member 14x and the front side spring member 14y set the movable body 3 in a supported state by the support body 2 so as to be capable of moving along the optical axis "L" of the lens.

The rear side spring member 14x which is disposed on the holder 19 side (image side) is divided into two pieces, i.e., two spring pieces 14a and 14b. Two end parts (winding start and winding end) of the first coil 31 and the second coil 32 are electrically connected with the spring pieces 14a and 14b. Further, two spring pieces 14a and 14b are electrically connected with the terminal members 195a and 195b respectively which are held by the holder 19. Therefore, the rear side spring member 14x (spring pieces 14a and 14b) also functions as a power supply member to the first coil 31 and the second coil 32.

The lens drive device 1 further includes a ring-shaped magnetic piece 130 which is held at an upper end of the sleeve 13. The magnetic piece 130 structures a magnetic spring which applies an urging force in the optical axis "L" direction to the movable body 3 by an attraction force acting between the magnets 17 and the magnetic piece 130. Therefore, since the movable body 3 is prevented from being displaced by its own weight at no energization time, the movable body 3 is capable of being held in a desired attitude and, in addition, impact resistance can be improved. Further, since the magnetic piece 130 acts as a back yoke, leakage flux from magnetic paths structured between the magnets 17 and the first coil 31 and the second coil 32 can be reduced. A bar-like magnetic body may be used as the magnetic piece.

An outer peripheral face of the sleeve 13 is formed with rectangular rib-shaped protruded parts 138 and 139 at an image side end part and at a front side end part, and a rib-shaped protruded part 136 is formed at a position slightly displaced on the front side in the optical axis "L" direction of the intermediate position that is sandwiched by the rib-shaped protruded parts 138 and 139. In this manner, a portion for winding the first coil 31 is formed at a portion sandwiched by the rib-shaped protruded parts 136 and 138 on the outer peripheral face of the sleeve 13, and a portion for winding the second coil 32 is formed at a portion sandwiched by the rib-shaped protruded parts 136 and 139.

An upper face of the rib-shaped protruded part 139 of the sleeve 13 is formed to be a spring connecting part 13y with which the front side spring member 14y is connected and a lower end face (image side end face) of the sleeve 13 is formed to be a spring connecting part 13x with which the rear side spring member 14x is connected.

Figure 4A:
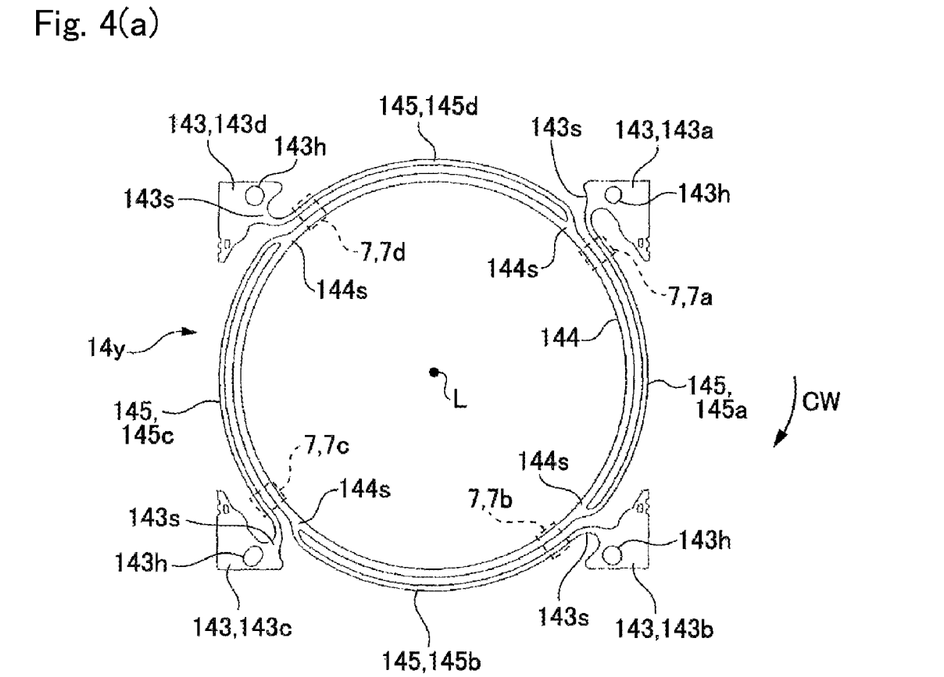
FIGS. 4(a) and 4(b) are explanatory views of spring members which are used in a lens drive device in accordance with an embodiment of the present invention.
Figure 4B:
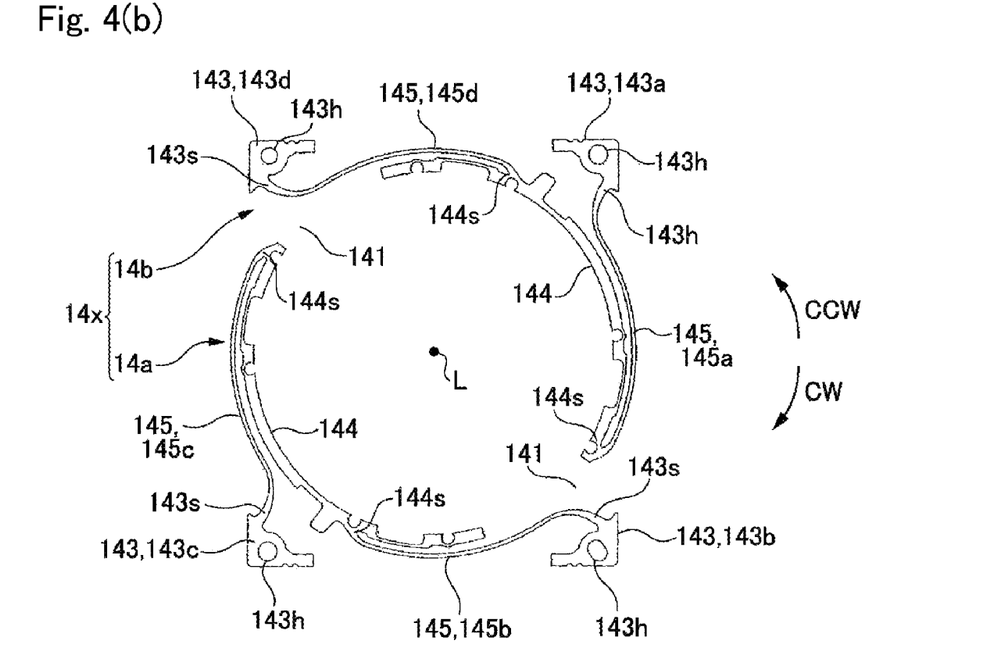

FIGS. 4(a) and 4(b) are explanatory views of spring members which are used in a lens drive device in accordance with an embodiment of the present invention. FIG. 4(a) is a plan view showing the front side spring member 14y and FIG. 4(b) is a plan view showing the rear side spring member 14x.

As shown in FIG. 4(a), the front side spring member 14y is provided with a movable body side connecting part 144 formed in a circular-ring frame shape which is connected with a front side end part of the sleeve 13, four support body side connecting parts 143 (support body side connecting parts 143a through 143d) which are connected with the spacer 11 on an outer peripheral side with respect to the movable body side connecting part 144, and four arm parts 145 (arm parts 145a through 145d) which connect the support body side connecting part 143 with the movable body side connecting part 144. The movable body side connecting part 144 is located on an inner peripheral side with respect to the support body side connecting part 143 (support body side connecting parts 143a through 143d). Each of four support body side connecting parts 143 is formed with a hole 143h for being connected with the spacer 11.

In this embodiment, the support body side connecting part 143 is located at each of overlapped positions with four corner portions of the spacer 11 and the yoke front plate part 185, which are described with reference to FIGS. 1(a) and 1(b) and FIG. 2, and the support body side connecting parts 143 are disposed with an equal angular interval in the circumferential direction with the optical axis "L" as a center. Each of four arm parts 145 is extended from a connected portion 143s with the support body side connecting part 143 in a substantially circular arc shape in a clockwise "CW" direction to the movable body side connecting part 144. The connected portions 144s of the arm parts 145 with the movable body side connecting parts 144 and the connected portions 143s of the arm parts 145 with the support body side connecting parts 143 are disposed with an equal angular interval in the circumferential direction with the optical axis "L" as a center. Further, the connected portion 144s of the arm part 145 with the movable body side connecting part 144 is located on an inner side in the radial direction with respect to the connected portion 143s of the adjacent arm part 145 in the clockwise "CW" direction with the support body side connecting part 143. For example, the connected portion 144s of the arm part 145a with the movable body side connecting part 144 is located on an inner side in the radial direction with respect to the connected portion 143s of the adjacent arm part 145b in the clockwise "CW" direction with the support body side connecting part 143s.

As shown in FIG. 4(b), the size and shape of the rear side spring member 14x are slightly different from the front side spring member 14y but its basic structure is similar to the rear side spring member 14x. In other words, roughly similarly to the front side spring member 14y, the rear side spring member 14x is provided with movable body side connecting parts 144 connected with the sleeve 13, four support body side connecting parts 143 (support body side connecting parts 143a through 143d) which are connected with the holder 19 on an outer peripheral side with respect to the movable body side connecting part 144, and four arm parts 145 (arm parts 145a through 145d) which connect the support body side connecting parts 143 with the movable body side connecting part 144. Each of four support body side connecting parts 143 is formed with a hole 143h for connecting with the holder 19. The support body side connecting part 143 is located at each of overlapped positions with four corner portions of the holder 19 which is described with reference to FIGS. 1(a) and 1(b) and FIG. 2. Further, each of four arm parts 145 is extended from a connected portion 143s with the support body side connecting part 143 in a substantially circular arc shape in a clockwise "CW" direction to the movable body side connecting part 144. Therefore, the connected portion 144s of the arm part 145 with the movable body side connecting part 144 is located on an inner side in a radial direction and at a slightly displaced position in a counter-clockwise "CCW" direction with respect to the connected portion 143s of the adjacent arm part 145 in the clockwise "CW" direction with the support body side connecting part 143. For example, the connected portion 144s of the arm part 145a with the movable body side connecting part 144 is located on an inner side in the radial direction and at a slightly displaced position in the counter-clockwise "CCW" direction with respect to the connected portion 143s of the adjacent arm part 145b in the clockwise "CW" direction and the support body side connecting part 143b. In this embodiment, the rear side spring member 14x is divided into two spring pieces 14a and 14b through two discontinuity portions 141 which are provided in the movable body side connecting part 144 and two spring pieces 14a and 14b are utilized as power supply members to the first coil 31 and the second coil 32. Therefore, both end parts (winding start part and winding end part) of one coil wire structuring the first coil 31 and the second coil 32 are connected to two spring pieces 14a and 14b by a method such as soldering. In this embodiment, the rear side spring member 14x is structured so that the spring pieces 14a and 14b are connected with each other through a frame-shaped part (not shown) to a predetermined manufacturing step and the spring member 14x is divided into two spring pieces 14a and 14b during assembling to the lens drive device 1.

In FIG. 3, the lens drive device 1 in this embodiment is in a waiting state where energization to the first coil 31 and the second coil 32 is stopped so that the magnetic drive mechanism 5 is stopped. In this state, the movable body 3 is located on the image side by an urging force of the front side spring member 14y and thus the image side end part of the sleeve 13 is elastically abutted with the holder 19.

In this state, when an electric current is supplied to the first coil 31 and the second coil 32 in a predetermined direction, upward (front side) electro-magnetic forces are respectively applied to or provided on the first coil 31 and the second coil 32. As a result, the sleeve 13 to which the first coil 31 and the second coil 32 are fixed begins to move toward the front side (direction shown by the arrow "A"). In this case, elastic forces for restricting movement of the sleeve 13 are respectively generated between the front side spring member 14y and the front end of the sleeve 13 and between the rear side spring member 14x and the rear end of the sleeve 13. Therefore, when the electro-magnetic force which moves the sleeve 13 to the front side and the elastic force which restricts movement of the sleeve 13 are balanced with each other, the sleeve 13 is stopped. In this case, when an amount of an electric current which is supplied to the first coil 31 and the second coil 32 is adjusted depending on an elastic force acting on the sleeve 13 by the rear side spring member 14x and the front side spring member 14y, the sleeve 13 (movable body 3) can be stopped at a desired position.

In this embodiment, a flat spring (gimbal spring) in which linear relationship is satisfied between its elastic force (stress) and its displacement amount (distortion amount) is utilized as the rear side spring member 14x and the front side spring member 14y. Therefore, linearity between a moving amount of the sleeve 13 and a current supplied to the first coil 31 and the second coil 32 is improved. Further, since two spring members, i.e., the rear side spring member 14x and the front side spring member 14y are used, large balanced forces are applied to each other in the optical axis direction when the sleeve 13 is stopped. Therefore, even when another force such as a centrifugal force or an impact force is applied in the optical axis direction, the sleeve 13 is stopped further stably. In addition, in the lens drive device 1, the sleeve 13 is stopped by utilizing balanced forces between an electro-magnetic force and an elastic force instead of colliding with a collided member (buffer member) and thus occurrence of a collision noise is prevented.

Figure 5A:
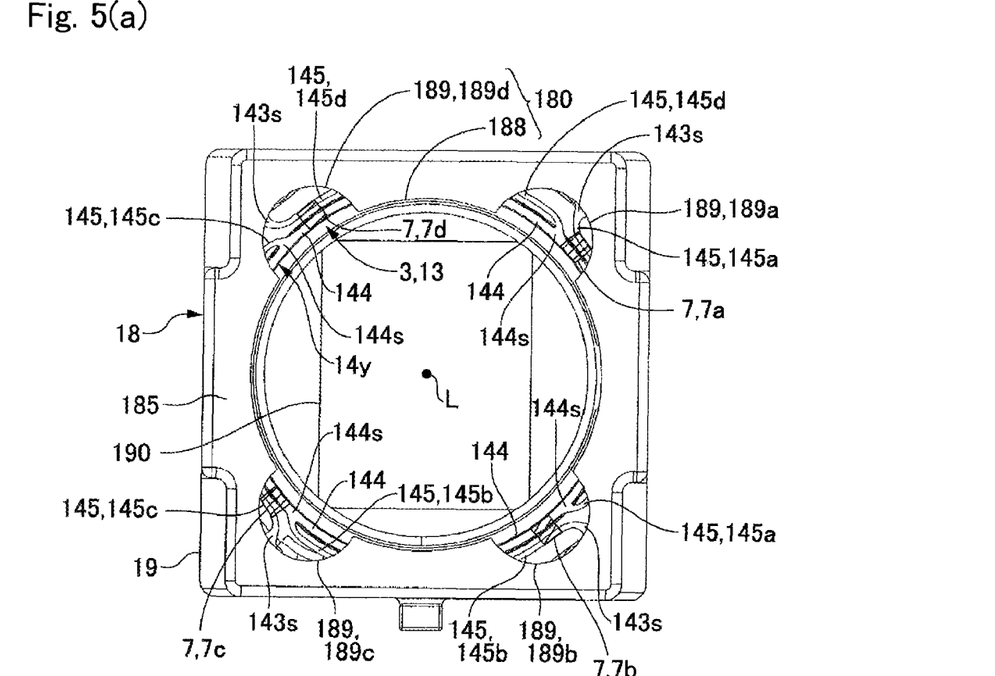
FIGS. 5(a) and 5(b) are explanatory views showing arrangement positions of damper material in a lens drive device in accordance with an embodiment of the present invention.
Figure 5B:
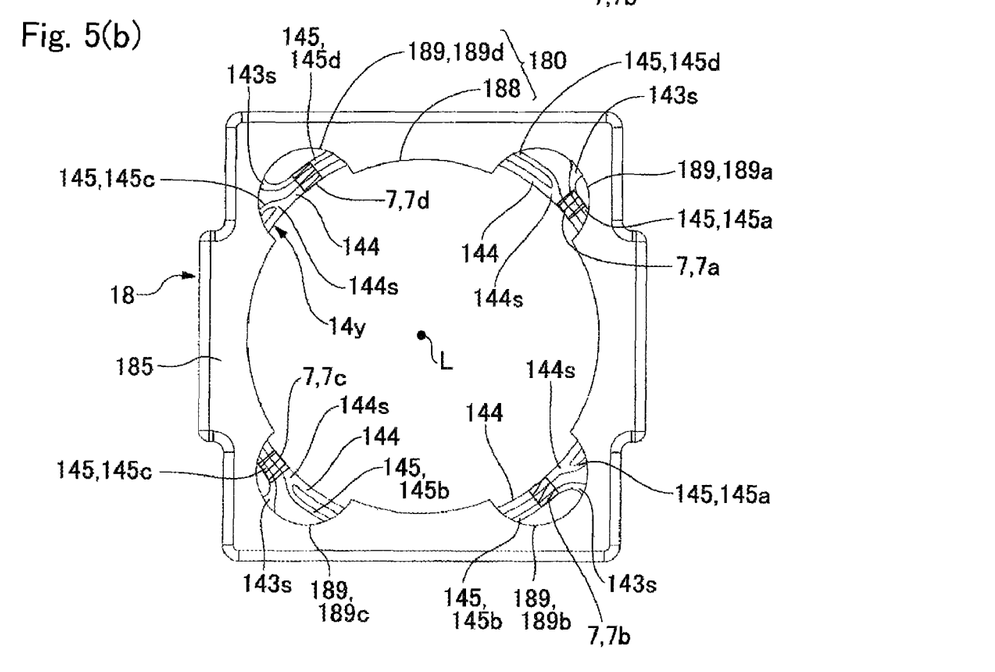
Figure 6:
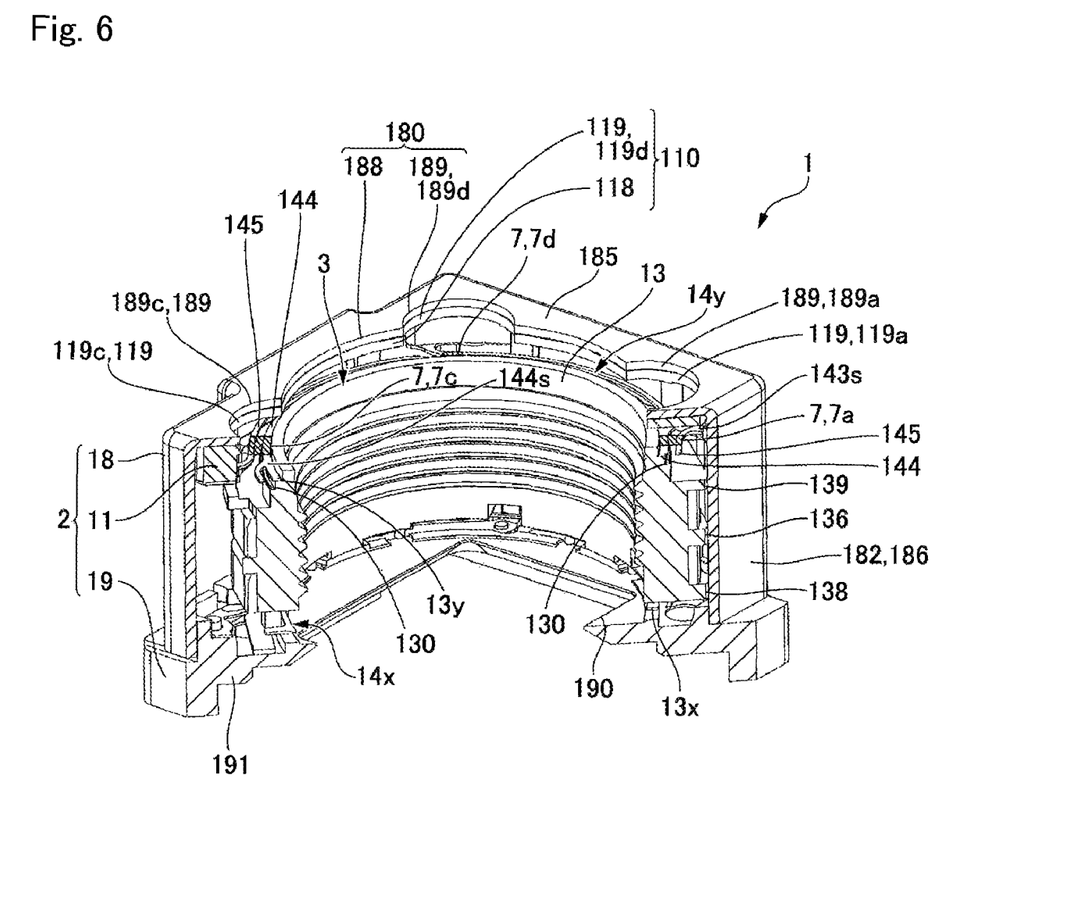
FIG. 6 is a longitudinal sectional view showing a lens drive device in accordance with an embodiment of the present invention which is cut at a position passing its diagonal positions.

FIGS. 5(a) and 5(b) are explanatory views showing arrangement positions of damper material in a lens drive device in accordance with an embodiment of the present invention. FIG. 5(a) is a plan view showing the lens drive device and FIG. 5(b) is an explanatory plan view showing a positional relationship between a yoke and a front side spring member. FIG. 6 is a longitudinal sectional view showing a lens drive device in accordance with an embodiment of the present invention which is cut at a position passing its diagonal positions.

In the lens drive device 1 in this embodiment, since the movable body 3 is supported by the rear side spring member 14x and the front side spring member 14y, when the movable body 3 is driven or, when vibration is applied from the outside, the movable body 3 may be vibrated. Therefore, in this embodiment, a structure is adopted which will be described below with reference to FIGS. 5(a) and 5(b) and FIG. 6.

As shown in FIGS. 1(a) and 1(b), FIGS. 5(a) and 5(b) and FIG. 6, in the lens drive device 1 in this embodiment, a yoke opening part 180 which is formed in the yoke front plate part 185 of the yoke 18 is overlapped with parts of the front side spring member 14y in the optical axis "L" direction. When the inside of the yoke 18 is viewed through the yoke opening part 180, parts of the front side spring member 14y are visible. More specifically, when viewed in the optical axis direction, the yoke opening part 180 of the yoke front plate part 185 is structured of a circular opening portion 188, which is formed in a circular shape with the optical axis "L" as a center so as to cover the movable body side connecting part 144 and the arm parts 145 of the front side spring member 14y, and four protruded opening portions 189 (protruded opening portions 189a through 189d) which are protruded on an outer side in the radial direction from an outer circumferential edge of the circular opening portion 188. Four protruded opening portions 189 are respectively protruded toward corner portions of the yoke front plate part 185. Therefore, four protruded opening portions 189 are disposed with an equal angular interval in the circumferential direction with the optical axis "L" as a center. Further, as shown in FIGS. 1(a) and 1(b), similarly to the yoke opening part 180, the spacer opening part 110 of the spacer 11 which is overlapped with the yoke front plate part 185 of the yoke 18 is structured of a circular opening portion 118, which is formed in a circular shape with the optical axis "L" as a center, and four protruded opening portions 119 (protruded opening portions 119a through 119d) which are protruded on an outer side in the radial direction from an outer circumferential edge of the circular opening portion 118. Four protruded opening portions 189 are respectively protruded toward the corner portions of the yoke front plate part 185 (corner portions of the spacer 11). Further, it may be structured that the size of the spacer opening part 110 is the same size as the yoke opening part 180 and thus the spacer opening part 110 is completely overlapped with the yoke opening part 180. Alternatively, an opening area of the spacer opening part 110 may be set slightly larger than that of the yoke opening part 180.

Further, as shown in FIGS. 5(a) and 5(b), the protruded opening portion 189 of the yoke opening part 180 and the protruded opening portion 119 of the spacer 11 are overlapped with a portion around the connected portion 144s of the movable body side connecting part 144 with the arm part 145 of the front side spring member 14y and a portion around the connected portion 143s of the support body side connecting part 143 with the arm part 145 in the optical axis "L" direction. Therefore, when the inside of the yoke 18 is viewed through the protruded opening portion 189 of the yoke opening part 180, a portion around the connected portion 144s of the movable body side connecting part 144 with the arm part 145 of the front side spring member 14y and a portion around the connected portion 143s of the support body side connecting part 143 with the arm part 145 are visible.

Therefore, in this embodiment, a damper material 7 having viscoelasticity such as silicone-based gel is applied to or provided on a portion of the front side spring member 14y which is overlapped with the protruded opening portion 189 of the yoke opening part 180 in the optical axis "L" direction so as to extend over the movable body side connecting part 144 and the arm part 145. More specifically, the damper material 7 is applied or provided so as to extend over a portion of the arm part 145 which is located in the vicinity of the connected portion 143s of the arm part 145 with the support body side connecting part 143, and the movable body side connecting part 144. Therefore, in this embodiment, a portion which is vibrated largely (movable body side connecting part 144) when the movable body 3 is vibrated and a portion of the arm part 145 which is vibrated smaller (portion in the vicinity of the connected portion 143s of the arm part 145 with the support body side connecting part 143) are connected with each other through the damper material 7.

In this embodiment, the damper material 7 is provided at four positions extending over four arm parts 145 (arm parts 145a through 145d) and the movable body side connecting part 144 and the damper materials 7 are disposed with an equal angular interval in the circumferential direction with the optical axis "L" as a center. Further, four damper materials 7 (damper materials 7a through 7d) are rotationally symmetrically disposed with the optical axis "L" as the center, and the damper materials 7a and 7c located at diagonal positions and the damper materials 7b and 7d located at diagonal positions are located at point-symmetrical positions with the optical axis "L" as the center.

Further, in this embodiment, after assembling of the lens drive device 1 has been completed to a state shown in FIG. 1(a), the lens drive device 1 is washed and then, gel as the damper material 7 is coated through the yoke opening part 180. In this case, operation of the lens drive device 1 is confirmed and vibration of the movable body 3 is confirmed when the movable body 3 is driven or when vibration is applied from the outside and a coating amount and the like of the damper material 7 are adjusted in an optimum condition on the basis of the result of the confirmation. In this embodiment, the damper material 7 is applied to only portions extending over the movable body side connecting part 144 and the arm parts 145 and the damper material 7 is not applied to other portions.

Figure 7A:
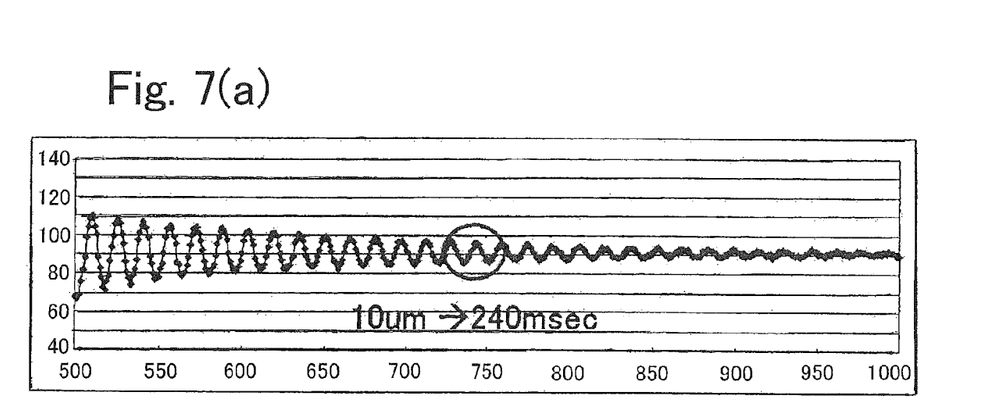
FIGS. 7(a), 7(b) and 7(c) are explanatory views showing comparison of damping characteristics of vibration in a lens drive device in accordance with an embodiment of the present invention with a conventional example.
Figure 7B:
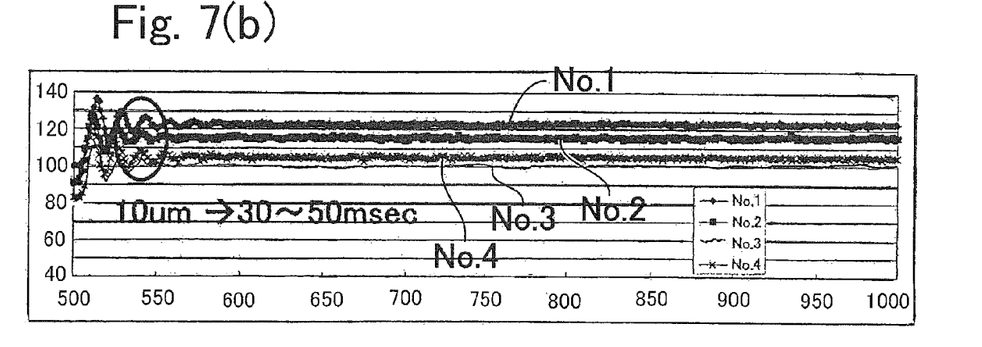
Figure 7C:
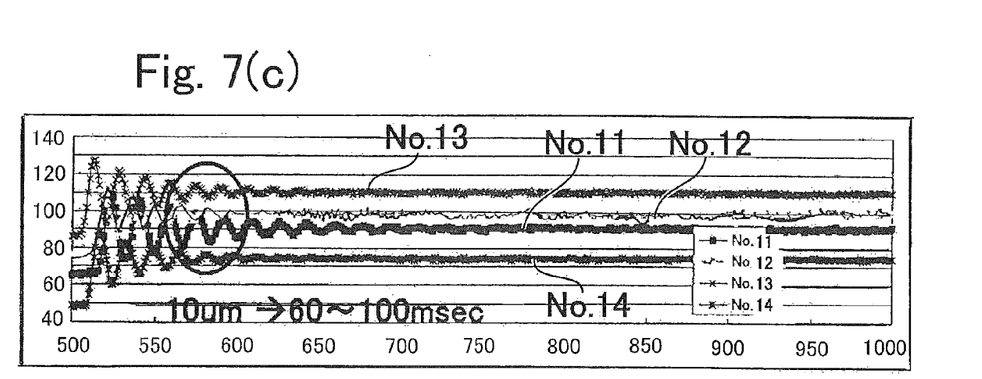

FIGS. 7(a), 7(b) and 7(c) are explanatory views showing comparison of damping characteristics of vibration in the lens drive device 1 to which at least an embodiment of the present invention is applied with a conventional example. FIG. 7(a) is an explanatory view showing damping characteristic of a conventional lens drive device 1 in which the damper material shown in FIGS. 5(a) and 5(b) is not applied. FIG. 7(b) is an explanatory view showing damping characteristics of the lens drive device 1 in accordance with this embodiment which has been described with reference to FIG. 1(a) through FIG. 6. FIG. 7(c) is an explanatory view showing damping characteristics of the lens drive device 1 as a modified example of this embodiment where the damper material 7 shown in FIGS. 5(a) and 5(b) is applied to only two portions located at diagonal positions. FIGS. 7(b) and 7(c) show damping characteristics respectively obtained from four samples (lens drive device/samples NO 1 through NO 4 and NO 11 through NO 14).

As understood from comparison of damping characteristic shown in FIG. 7(a) with damping characteristics shown in FIG. 7(b), in the conventional lens drive device in which the damper material 7 is not applied, it takes 240 msec until amplitude of vibration is damped to 10 μm. On the other hand, in the lens drive device 1 in this embodiment in which four damper materials 7 are provided, since vibration of the movable body 3 is absorbed by the damper materials 7, it takes only 30-50 msec until amplitude of vibration is damped to 10 μm. Therefore, the lens drive device 1 in this embodiment is superior in damping characteristic.

In accordance with an embodiment of the present invention, as shown in FIG. 7(c), even in the lens drive device 1 provided with only two damper materials 7 at diagonal positions, a time period when amplitude of vibration is damped to 10 μm is shortened to 60-100 msec. Therefore, the lens drive device 1 to which at least an embodiment of the present invention is applied is superior in damping characteristic. Accordingly, the damper material 7 may be provided at only two diagonal positions. However, as understood from comparison of the results shown in FIGS. 7(b) and 7(c), the damper material 7 is capable of damping vibration more effectively by providing four positions than two positions in the circumferential direction.

As described above, in the lens drive device 1 in this embodiment, the damper material 7 having viscoelasticity is provided on the front side spring member 14y so as to extend over the movable body side connecting part 144, which is easily vibrated with vibration of the movable body 3, and the arm part 145 which is hard to be vibrated in comparison with the movable body side connecting part 144. Therefore, vibration of the movable body 3 is damped in a short time period.

Further, the damper material 7 is provided on a portion overlapping in the optical axis "L" direction with the yoke opening part 180 provided in the yoke front plate part 185 and thus, the damper material 7 can be applied to the front side spring member 14y disposed in the inside through the yoke opening part 180 in the final stage of assembling steps. Therefore, the damper material 7 is prevented from sticking to other portions after the damper material has been applied and, even when washing is performed after completion of assembling of the lens drive device 1, no damper material 7 is melted to stick to other portions.

Further, since the damper material 7 is applied to the front side spring member 14y disposed in the inside through the yoke opening part 180 in the final stage of assembling steps, an operation of the lens drive device 1 is confirmed in the final stage of assembling and an amount of the damper material and the like can be adjusted on the basis of the result of confirming its operation.

In addition, the damper material 7 is applied to the front side spring member 14y which is located on the inner side of the yoke 18 and thus sticking of foreign matters to the damper material 7 can be prevented by the yoke 18 during the lens drive device 1 is used.

Further, in this embodiment, the damper material 7 is applied to only portions of the front side spring member 14y extending over the movable body side connecting part 144 located on the most inner peripheral side and the arm parts 145. Therefore, since the yoke opening part 180 can be formed relatively small, leakage of magnetic flux and entering of foreign matters through the yoke opening part 180 can be restrained.

Further, the yoke opening part 180 is provided with the protruded opening portions 189 which are protruded to an outer side in the radial direction from an outer circumferential edge of the circular opening portion 188 and the damper material 7 is preferably provided at positions overlapping with the protruded opening portions 189 in the optical axis "L" direction. According to this structure, even when the damper material 7 is applied to portions located on the outer peripheral side, the opening area of the yoke opening part 180 may be set relatively small, leakage of magnetic flux and entering of foreign matters through the yoke opening part 180 can be restrained. In addition, the yoke front plate part 185 is provided with a rectangular shape when viewed in the optical axis "L" direction and the protruded opening portions 189 are protruded toward corner portions of the yoke front plate part 185. Therefore, the protruded opening portions 189 are directed to corner portions of the yoke front plate part 185 which are portions having a margin in space and thus the size of the lens drive device 1 in a direction perpendicular to the optical axis "L" can be made relatively small.

In addition, in this embodiment, the support body 2 is provided with the spacer 11 which is connected with the support body side connecting part 143 between the front side end part of the movable body 3 and the yoke front plate part 185. Therefore, the front side spring member 14y can be fixed by using the spacer 11 and thus, different from a case that the front side spring member 14y is directly fixed to the yoke 18, a complicated work such that a protruded part for fixing the front side spring member 14y is provided on the inner side of the yoke 18 is not required. Moreover, the spacer 11 is formed with the spacer opening part 110 having larger opening area than the yoke opening part 180 so as to overlap with the yoke opening part 180 in the optical axis "L" direction. Therefore, in the final stage of assembling steps, the damper material 7 can be applied to the front side spring member 14y that is disposed in the inside through the yoke opening part 180.

Further, the damper materials 7 are provided at four positions with an equal angular interval in the circumferential direction with the optical axis "L" as the center and thus vibration of the movable body 3 is efficiently damped without deviation in the circumferential direction.

In addition, in this embodiment, silicone-based viscoelastic composition (silicone gel) is used as the damper material 7 and, when this type of the damper material 7 is utilized, the damper material 7 can be applied by a method of coating. Therefore, it is suitable to apply the damper material 7 to the front side spring member 14y disposed in the inside through the yoke opening part 180 in the final stage of assembling steps. Further, silicone-based viscoelastic composition is superior in adhesiveness to a structural member.

Figure 8:
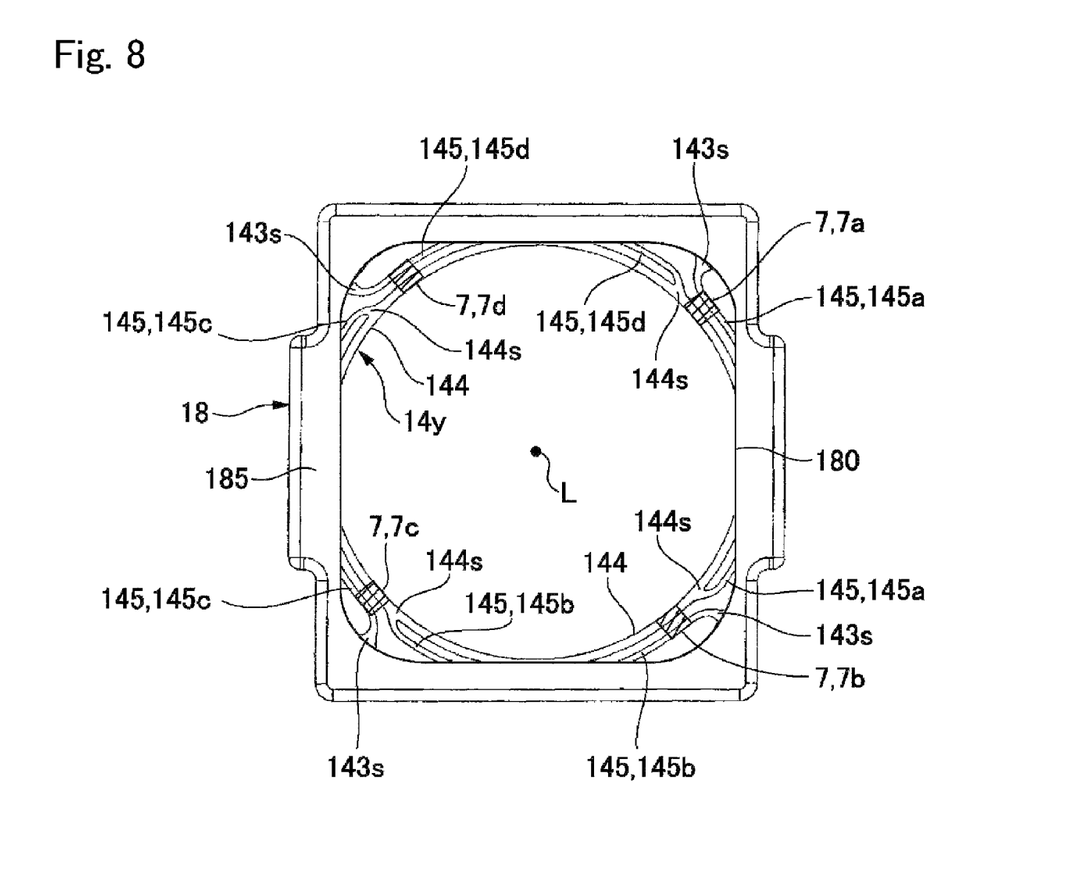
FIG. 8 is an explanatory view showing a modified example of a yoke opening part which is provided in a lens drive device in accordance with an embodiment of the present invention.

FIG. 8 is an explanatory view showing a modified example of the yoke opening part 180 which is provided in the lens drive device 1 to which at least an embodiment of the present invention is applied and FIG. 8 corresponds to FIG. 5(b). A basic structure of this embodiment is similar to the above-mentioned first embodiment and thus the same reference signs are used for common portions in the drawing and their descriptions are omitted.

In the embodiment described above, the yoke opening part 180 is provided with the protruded opening portions 189 which are protruded from the outer circumferential edge of the circular opening portion 188 to the outer side in the radial direction. However, as shown in FIG. 8, it may be structured that a roughly rectangular yoke opening part 180 is provided and portions of the front side spring member 14y where the damper materials 7 are applied through the yoke opening part 180 (portions extending over the movable body side connecting part 144 and the arm parts 145) are visible from the front side in the optical axis "L" direction.

Figure 9A:
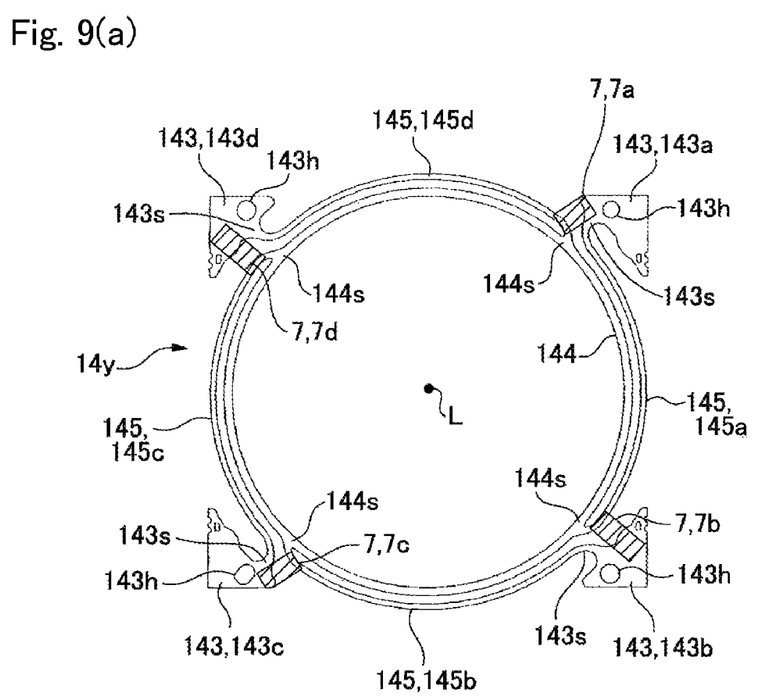
FIGS. 9(a) and 9(b) are explanatory views showing modified examples of arrangement positions of damper material in a lens drive device in accordance with an embodiment of the present invention.
Figure 9B:
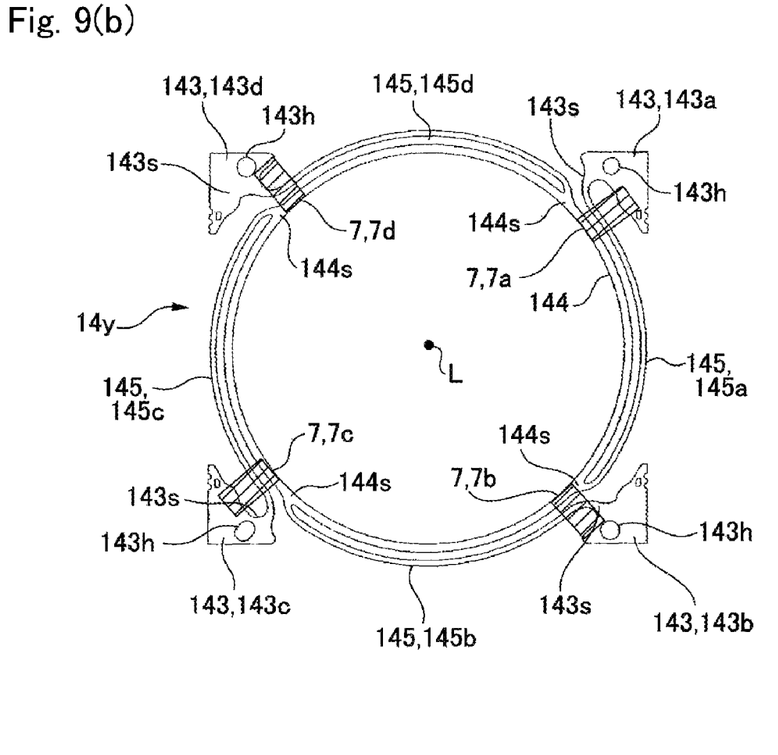

FIGS. 9(a) and 9(b) are explanatory views showing modified examples of arrangement positions of the damper material 7 in the lens drive device 7 to which at least an embodiment of the present invention is applied. FIG. 9(a) is an explanatory view showing a case that the damper material 7 is applied so as to extend over the support body side connecting parts 143 and the arm parts 145 and FIG. 9(b) is an explanatory view showing a case that the damper material 7 is applied so as to extend over the support body side connecting parts 143 and the movable body side connecting part 144.

In the embodiment described with reference to FIG. 1(a) through FIG. 6, the damper material 7 is applied so as to extend over the movable body side connecting part 144 and the arm parts 145. However, the damper material 7 may be applied to any portion which is overlapped with the yoke opening part 180 in the optical axis "L" direction. In other words, the damper material 7 may be applied to a portion extending over the arm part 145 and the support body side connecting part 143, a portion extending over the movable body side connecting part 144 and the support body side connecting part 143, a portion extending over the movable body 3 and the arm part 145, a portion extending over the arm part 145 and the support body 2, or a portion extending over the movable body 3 and the support body 2. For example, as shown in FIG. 9(a), the damper material 7 may be applied so as to extend over the support body side connecting parts 143 and portions of the arm parts 145 in the vicinity of the connected portions 144s of the arm parts 145 with the movable body side connecting part 144.

Further, as shown in FIG. 9(b), the damper material 7 may be applied so as to extend over the support body side connecting part 143 and the movable body side connecting part 144. In this embodiment, the damper material 7 is applied so as to extend over the support body side connecting part 143 and the movable body side connecting part 144 and, in addition, over the arm part 145. In this embodiment shown in FIG. 9(b), the damper material 7 is applied so as to extend over a portion of the arm part 145 in the vicinity of the connected portion 143s with the support body side connecting part 143. However, the damper material 7 may be applied so as to extend over a portion of the arm part 145 in the vicinity of the connected portion 144s with the movable body side connecting part 144.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a support body;
a movable body provided with a lens;
a magnetic drive mechanism for magnetically driving the movable body in a lens optical axis direction with respect to the support body; and
a front side spring member which is connected with a front side end part in the lens optical axis direction of the movable body and the support body;
wherein the front side spring member comprises:
a support body side connecting part which is connected with the support body;
a movable body side connecting part which is located on an inner peripheral side with respect to the support body side connecting part and connected with the movable body; and
an arm part which is connected with the support body side connecting part and the movable body side connecting part;
wherein the support body comprises a yoke comprising:
a yoke front plate part which faces the front side end part of the movable body from a front side in the lens optical axis direction; and
a yoke side plate part which faces a side face part of the movable body;
wherein the yoke front plate part is formed with a yoke opening part which is overlapped with at least a part of the front side spring member in the lens optical axis direction;
wherein damper material having viscoelasticity is provided on one of a portion extending over the movable body side connecting part and the arm part, a portion extending over the arm part and the support body side connecting part, a portion extending over the movable body side connecting part and the support body side connecting part, a portion extending over the movable body and the arm part, a portion extending over the arm part and the support body, and a portion extending over the movable body and the support body, the portion being overlapped with the yoke opening part in the lens optical axis direction;
the yoke opening part is provided with a circular opening portion with a lens optical axis as a center and a protruded opening portion which is protruded to an outer side in a radial direction from an outer circumferential edge of the circular opening part, and
the damper material is provided on the portion overlapping with the protruded opening portion in the lens optical axis direction.

2. The lens drive device according to claim 1, wherein the damper material is provided only on the portion extending over the movable body side connecting part and the arm part.

3. The lens drive device according to claim 1, wherein a connected portion of the movable body side connecting part with the arm part and a connected portion of the support body side connecting part with the arm part are located in the protruded opening portion.

4. The lens drive device according to claim 1, wherein
the yoke front plate part is formed in a rectangular shape when viewed in the lens optical axis direction, and
the protruded opening portion is protruded toward a corner portion of the yoke front plate part.

5. The lens drive device according to claim 4, wherein a connected portion of the movable body side connecting part with the arm part and a connected portion of the support body side connecting part with the arm part are located in the protruded opening portion.

6. The lens drive device according to claim 5, wherein the damper material is provided so as to extend over the movable body side connecting part and a portion of the arm part in a vicinity of the connected portion of the arm part with the support body side connecting part.

7. The lens drive device according to claim 6, wherein the damper material is provided on plural positions with an equal angular interval in a circumferential direction with the lens optical axis as a center.

8. The lens drive device according to claim 2, wherein
the support body is provided with a spacer which is disposed between the front side end part of the movable body and the yoke front plate part and connected with the support body side connecting part, and
the spacer is provided with a spacer opening part whose opening area is larger than an opening area of the yoke opening part and which is overlapped with the yoke opening part in the lens optical axis direction.

9. A lens drive device comprising:
a support body;
a movable body provided with a lens;
a magnetic drive mechanism for magnetically driving the movable body in a lens optical axis direction with respect to the support body; and
a front side spring member which is connected with a front side end part in the lens optical axis direction of the movable body and the support body;
wherein the front side spring member comprises:
a support body side connecting part which is connected with the support body;
a movable body side connecting part which is located on an inner peripheral side with respect to the support body side connecting part and connected with the movable body; and
an arm part which is connected with the support body side connecting part and the movable body side connecting part;
wherein the support body comprises a yoke comprising:
a yoke front plate part which faces the front side end part of the movable body from a front side in the lens optical axis direction; and
a yoke side plate part which faces a side face part of the movable body;
wherein the yoke front plate part is formed with a yoke opening part which is overlapped with at least a part of the front side spring member in the lens optical axis direction;
damper material having viscoelasticity is provided on one of a portion extending over the movable body side connecting part and the arm part, a portion extending over the arm part and the support body side connecting part, a portion extending over the movable body side connecting part and the support body side connecting part, a portion extending over the movable body and the arm part, a portion extending over the arm part and the support body, and a portion extending over the movable body and the support body, the portion being overlapped with the yoke opening part in the lens optical axis direction;

the yoke front plate part is formed in a rectangular shape having four corner portions when viewed in the lens optical axis direction, the support body side connecting part of the front side spring member is located at positions overlapping with the four corner portions of the yoke front plate part, the arm part is extended in a substantially circular arc shape from a connected portion with the support body side connecting part to the movable body side connecting part, a connected portion of the arm part with the movable body side connecting part and the connected portion of the arm part with the support body side connecting part are disposed with an equal angular interval in a circumferential direction with a lens optical axis as a center;

the yoke opening part comprises:
- a circular opening portion which is formed with a lens optical axis as a center so as to cover the movable body side connecting part and the arm part of the front side spring member when viewed in the lens optical axis direction; and
- protruded opening portions which are protruded to an outer side in a radial direction from an outer circumferential edge of the circular opening part; and the protruded opening portion is protruded toward the corner portion of the yoke front plate part, and the damper material is provided on a portion overlapping with the protruded opening portion in the lens optical axis direction.

10. The lens drive device according to claim 9, wherein the connected portion of the movable body side connecting part with the arm part and the connected portion of the support body side connecting part with the arm part are located in the protruded opening portion.

11. The lens drive device according to claim 10, wherein the damper material is provided on either of:
- a portion extending over the movable body side connecting part and a portion of the arm part in a vicinity of the connected portion of the arm part with the support body side connecting part,
- a portion extending over the support body side connecting part and a portion of the arm part in a vicinity of the connected portion of the arm part with the movable body side connecting part, and
- a portion extending over the movable body side connecting part, the arm part and the support body side connecting part.

12. The lens drive device according to claim 9, wherein the support body is provided with a spacer which is disposed between the front side end part of the movable body and the yoke front plate part and connected with the support body side connecting part, and the spacer is provided with a spacer opening part whose opening area is larger than an opening area of the yoke opening part and which is overlapped with the yoke opening part in the lens optical axis direction.

13. The lens drive device according to claim 9, wherein the damper material is provided on plural positions with an equal angular interval in a circumferential direction with the lens optical axis as the center.

14. The lens drive device according to claim 1, wherein the damper material is silicone-based viscoelastic composition.

* * * * *